(12) United States Patent
Caldwell

(10) Patent No.: US 8,485,136 B2
(45) Date of Patent: Jul. 16, 2013

(54) PET WASH VENDING STATION

(75) Inventor: Russell L. Caldwell, Garden Prairie, IL (US)

(73) Assignee: CCSI International, Inc., Garden Prairie, IL (US)

( * ) Notice: Subject to any disclaimer, the term of this patent is extended or adjusted under 35 U.S.C. 154(b) by 0 days.

(21) Appl. No.: 13/461,937

(22) Filed: May 2, 2012

(65) Prior Publication Data
US 2012/0279457 A1    Nov. 8, 2012

Related U.S. Application Data

(60) Provisional application No. 61/518,202, filed on May 2, 2011, provisional application No. 61/518,201, filed on May 2, 2011.

(51) Int. Cl.
*A01K 13/00* (2006.01)

(52) U.S. Cl.
USPC .......................................................... 119/675

(58) Field of Classification Search
USPC ................. 119/675, 673, 671, 600, 602, 603, 119/665, 668, 669, 676
See application file for complete search history.

(56) References Cited

U.S. PATENT DOCUMENTS

| | | | | |
|---|---|---|---|---|
| 2,611,341 A * | 9/1952 | Paris | ............................. | 119/675 |
| 3,583,368 A * | 6/1971 | Mandelhaum et al. | ....... | 119/603 |
| 4,332,217 A * | 6/1982 | Davis | ............................ | 119/700 |
| 4,379,438 A * | 4/1983 | Peardon | ........................ | 119/702 |
| 4,549,502 A * | 10/1985 | Namdari | ....................... | 119/664 |
| 4,987,619 A * | 1/1991 | Smith | ............................... | 4/612 |
| 5,148,771 A * | 9/1992 | Schuett et al. | ................ | 119/479 |
| 5,738,044 A * | 4/1998 | Gaylinn | ........................ | 119/671 |
| 5,794,570 A * | 8/1998 | Foster et al. | .................. | 119/756 |
| 5,931,174 A * | 8/1999 | Salas et al. | ..................... | 134/89 |
| 8,186,308 B1 * | 5/2012 | Hluben et al. | ................ | 119/676 |
| 2005/0034680 A1 * | 2/2005 | Tunnell | ......................... | 119/675 |

* cited by examiner

*Primary Examiner* — Yvonne Abbott

(74) *Attorney, Agent, or Firm* — Reinhart, Boerner Van Deuren P.C.

(57) ABSTRACT

A pet wash station is provided that includes a wash room with a pet wash tub and a flexible spray hose to enable washing a pet in the tub. The tub drains into a collection trough in the floor of an equipment room. The equipment room and wash room share a common wall. The wash room floor extends under the common wall into the equipment room. The wash room floor drains towards the common wall, through a space between the wash room floor and the common wall, and into the trough in the equipment room floor.

20 Claims, 4 Drawing Sheets

US 8,485,136 B2

PET WASH VENDING STATION

CROSS-REFERENCE TO RELATED PATENT APPLICATIONS

This patent application claims the benefit of U.S. Provisional Patent Application No. 61/518,202, filed May 2, 2011, and U.S. Provisional Patent Application No. 61/518,201, filed May 2, 2011, the entire teachings and disclosure of which are incorporated herein by reference thereto.

FIELD OF THE INVENTION

This invention generally relates to the pet care and maintenance industry, and more particularly relates to a pet wash station that enables a user to wash a pet.

BACKGROUND OF THE INVENTION

Self-service pet washing facilities are not currently readily available to pet owners. Therefore, washing a pet typically requires the owner to pay the cost of taking the pet to a professional grooming establishment, or putting up with inconveniences of washing the pet at home.

Washing a pet, particularly long-hair dogs and cats, can create a significant mess to clean up if done in one's own home, which is typically not equipped with the proper facilities for washing a pet. Further, washing a pet outside presents a different set of challenges in that it is difficult to keep a pet contained and out of the dirt until dry.

Thus, there is a need for a pet wash station, configured to vend self-service pet wash capability to pet owners, and thereby address the above described disadvantages and inconveniences typically associated with washing a pet.

The invention provides such a pet wash vending station. These and other advantages of the invention, as well as additional inventive features, will be apparent from the description of the invention provided herein.

BRIEF SUMMARY OF THE INVENTION

In one aspect, the invention provides a pet wash station that includes a wash room with a pet wash tub and a flexible spray hose for washing a pet in the tub. The tub drains into a collection trough in the floor of an equipment room. The wash room floor extends under a common wall between the wash room and equipment room to also drain into the collection trough.

In another aspect, the invention provides a unique pet wash station, configured to vend self-service pet wash capability to pet owners.

In yet another aspect, the invention provides a pet wash station that is easy to setup and operate, including ease of cleanup after a pet wash is complete.

The foregoing objectives are achieved, in one aspect, by a portable pet wash station according to the teachings of the instant invention. An embodiment of such a portable pet wash station includes a wash room accessible from a wash room doorway. The washroom includes a tub for washing a pet as well as a washroom floor disposed under the tub. An equipment room is accessible from an equipment room doorway. The equipment room includes an electric power connection, a water supply connection, and a sewer line connection, such that the portable wash station can be transported as a single unit and installed in any area that supports a connection for electric power, water, and sewer. A common wall separates the wash room from the equipment and is disposed to restrict access from the wash room to the equipment room. The portable pet wash station also includes a floor common to both the equipment room and the washroom, the floor having a collection trough formed therein for collection and drainage of waste water that accumulates on the washroom floor. The portable pet wash station also includes a control unit that allows a user to control the portable pet wash station.

In certain embodiments, access to the equipment room doorway is restricted from non-authorized personnel. The portable pet wash station can also include a space in the common wall at a juncture between the common wall and the washroom floor that provides access from the washroom to the equipment room. A collection trough is formed in the washroom floor that connects to the sewer line connection. The washroom floor is grated such that water and debris that gathers on the washroom floor drains through the space under the common wall and into the collection trough.

In certain embodiments, a liquid hose for discharging a fluid is situation in the washroom and connects to a wash-water supply contained in the equipment room. The control unit allows the user to turn the wash-water supply on and off. The control unit also allows the user to alter the temperature of the wash-water supply. The control unit also allows the user to add soap to the wash-water supply.

In certain embodiments, the portable pet wash station also includes an air supply unit in the equipment room that attaches to a first end of an air supply hose that includes a second end which extends through the common wall into the washroom. The control unit allows the user to turn the air on and off, and control the temperature of the air. In certain embodiments, the control unit is disposed outside of the washroom and configured to collect a payment prior to allowing a user to enter the washroom.

In certain embodiments, the surface area of the washroom floor is larger than a surface area of a washing surface of the tub, the washroom floor thereby providing an alternate location for pet washing.

In another aspect, the foregoing objectives are achieved by a portable pet wash station. An embodiment of a portable pet wash station according to this aspect includes a first washroom accessible from a first washroom doorway including a first tub for washing, a first liquid hose for discharging a liquid, a first washroom floor disposed under the first tub. The portable pet wash station also includes an equipment room accessible from an equipment room doorway. The equipment room includes an electric power connection, a water supply connection and a sewer line connection such that the portable pet wash station can be transported as a single unit and installed in an area that supports a connection for electric power, water, and sewer. A first common wall separates the first washer from the equipment room and is disposed to restrict access from the first wash room to the equipment room. The portable pet wash station also includes a second wash room accessible from a second wash room doorway including a second tub for washing, a second liquid hose for discharging liquid, and a second wash room floor disposed under the tub. A second common wall separates the second wash room from the equipment room and is disposed to restrict access from the second wash room to the equipment room. The portable pet wash station also includes a collection trough formed in a floor of the equipment room, the collection trough positioned for collection and drainage of waste water that accumulates on the washroom floor.

In certain embodiments, the first wash room and the second wash room are disposed on opposite sides of the equipment room. The portable pet wash station also includes a first space in the first common wall at a juncture between the first common wall and the first wash room floor that provides access from the first wash room to the equipment room. A second space in the second common wall is formed at a juncture between the second common wall and the second wash room floor that provides access from the second wash room to the equipment room.

In certain embodiments, a collection trough is disposed in the equipment room that connects to the sewer line connection. The first wash room floor is grated such that water and debris that gathers on the first wash room floor drains through the first space under the first common wall and into the collection trough. The second wash room floor is grated such that water and debris that gathers on the second wash room floor drains through the second space under the second common wall and into the collection trough.

In certain embodiments, each of the first and second tubs includes a drain. The drain of the first tub extends through the first common wall and is in fluid communication with the drainage trough. The drain of the second tub extends through the second common wall and is in fluid communication with the drainage trough. Each of the first and second tubs are grated such that water and debris that gathers in each of the first and second tubs drains through the respective drain thereof and into the drainage trough.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
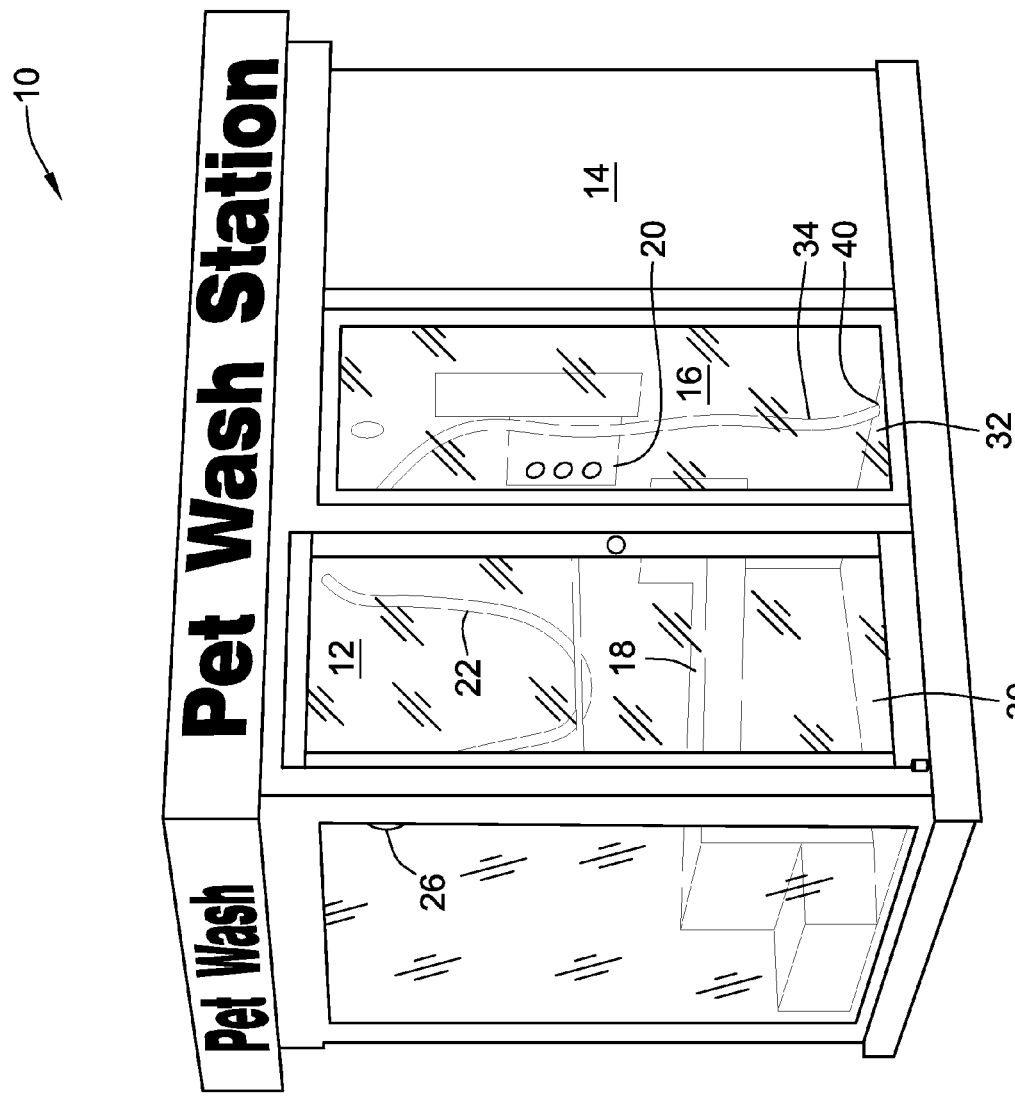
FIG. 1 is a perspective view of a pet wash station according to the invention.

FIG. 1 illustrates one embodiment of a pet wash station 10 according to the invention. The pet wash station includes a wash room 12 and an equipment room 14. The wash room is configured for and provided with means for manually washing, rinsing and optionally air drying a pet. The equipment room 14 houses operational and support equipment, electrical wiring and controls, electric power, water supply and sewer connections, and anything to which restricted access is to be established. The wash room 12 and equipment room 14 are separated by a common wall 16.

The preferred wash room 12 and equipment room 14 are generally enclosures, each with a floor, a ceiling, surrounding sides, and a doorway, but are connected together to establish a self-contained vending unit that can be shipped as a single unit ready to be set into place and hooked up to site electrical power, water supply and sewer lines.

The wash room 12 is provided with a wash tub 18 to place a pet into for washing, wash-water supply facility to enable manual washing the pet in the tub, optional air drying supply facility, and a vending control unit 20 for controlling availability of the wash water and, if applicable, the drying air in the wash room. The wash tub 18 is positioned above the floor 30 of the wash room 12 so that the wash room floor 30 catches water that may splash from the tub 18.

In the embodiment illustrated in FIG. 1, a flexible liquid hose 22 extends from under the common wall 16 to supply a flow of liquid. The free end of the hose 22 is located above and proximate to the wash tub 18 for wash and rinse capability of a pet in the tub 18. The liquid hose 22, on a feed end, is connected to a pressurized wash-water supply unit 24 in the equipment room 14 (see FIG. 2). Further, a manually operable (e.g., trigger operated) spray head or nozzle 26 may be connected to the free end of the hose 22 for fine user flow control while washing the pet.

Figure 2:
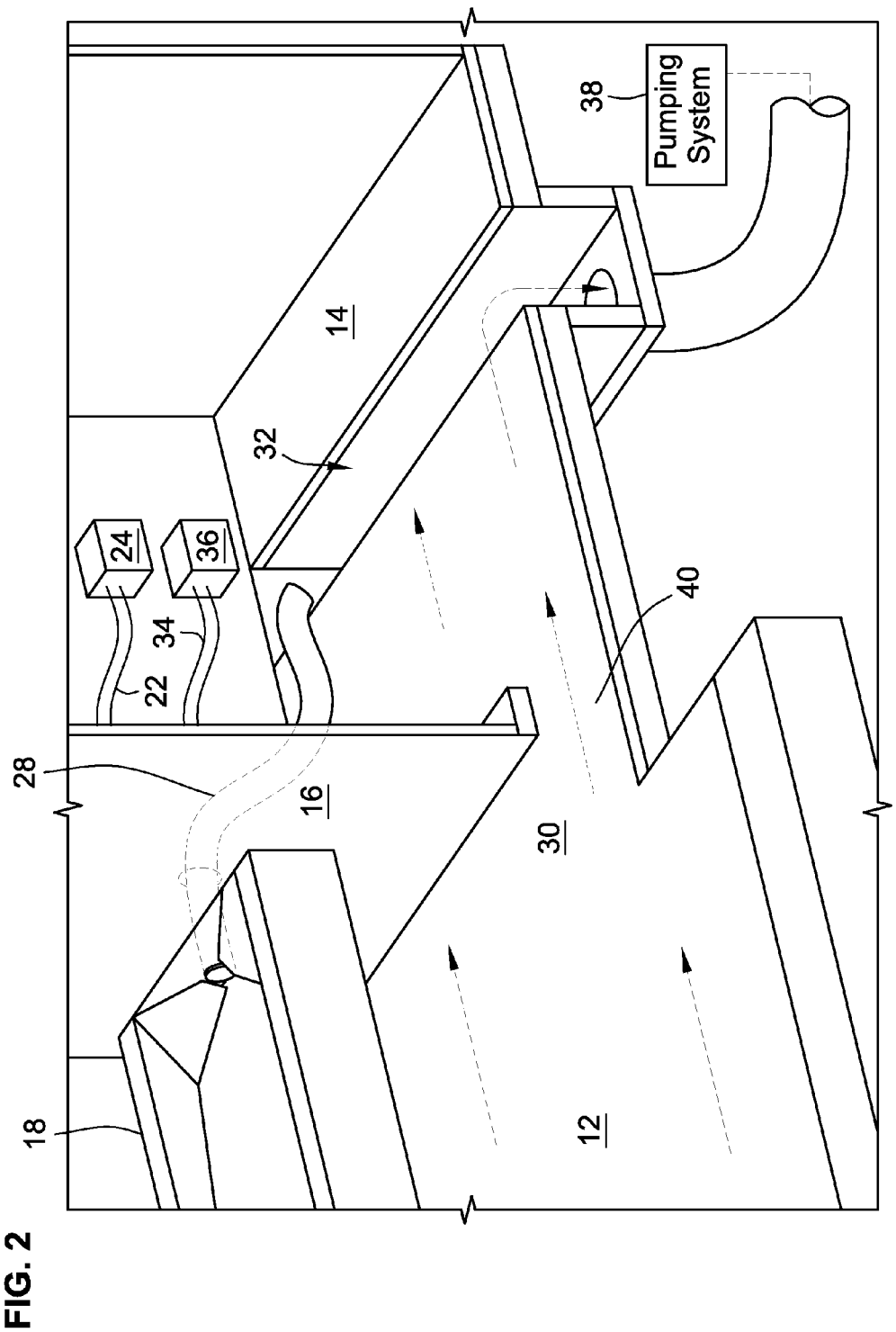
FIG. 2 is an enlarged fragmentary perspective view of certain aspects of the pet wash station shown in FIG. 1.

Turning to FIG. 2, the wash-water supply unit 24 may be, for example, a pump, connected to a water supply line to the pet wash station 10 (i.e., an external water source) to supply the user with clean water for both washing and rinsing the pet. The wash-water supply unit may alternately be configured to provide both a washing mixture (e.g., shampoo and water) and clean rinse water, such as an electrically controlled mixing manifold responsive to user selected input at the vending control unit 20.

The wash tub 18 includes a drain 28 connected to drain into a collection trough 32 in the floor of the equipment room 14. The wash room floor 30 slopes down towards and under the common wall 16 to the collection trough 32 such that water on the wash room floor 30 flows (by gravity) through a space 40 between the common wall and the floor 30 to also drain into the collection trough 32. The waste water in the collection trough 32 (from both the wash tub and the wash room floor) is pumped through a filter to remove the hair and then into the outside sewer line. As shown schematically, the trough 32, and particularly the drain associated therewith, is in fluid communication with a pumping system 38. The pumping system 38 is sufficiently sized to facilitate the drainage of waste water and refuse which has collected on the wash room floor 30 and/or the tub 18. Those skilled in the art will recognize that the aforementioned grading or sloping of the wash room floor 30 for drainage under gravity need not be incorporated, as the pumping system 38 operates to actively remove a majority of standing waste water, with the remainder being pushed into trough 32 via a squeegee, mop, or the like.

This wash room floor 30 drainage arrangement permits quick and easy floor cleanup with a broom or floor squeegee or spray hose, by simply sweeping, pushing or spraying any water and hair on the floor under the common wall 16 and into the collection trough 32. Thereafter, the pumping system 38 will efficiently pump the waste water through the sewer connection connected to the pet washing station 10.

As illustrated in FIG. 2, the wash room 12 has a wash tub 18 and floor 30 combination that provide two alternate pet wash locations. In particular, the wash room floor 30 is sufficiently larger than the tub 18 (when viewed from above) so that a pet owner has room to wash a pet on the floor 30 rather than in the tub 18. Configuring the wash room floor 30 as an alternate pet washing location is particularly useful for washing larger pets (that may be difficult for the user to lift into the tub) and pets that may resist staying in the tub 18. However, use of the wash room floor 30 as a pet washing location will result in increased pet hair accumulation on the floor 30 and normally aggravate cleanup of a conventional floor. Advantageously, this potential additional hair accumulation on the floor 30 of the wash room 12 will not significantly affect the speed and ease of cleaning of the wash room floor 30 of the pet wash station 10. The wash room floor 30 is graded such that liquid drains toward and under the common wall 16 via the space 40, thereby draining directly into the collection trough 32 in the equipment room 14. As such, the floor 30 is quickly and easily cleaned by simply sweeping or pushing or spraying the hair and waste water on the floor 30 under the common wall 16 into the collection trough 32 in the equipment room 14, as illustrated in FIG. 3.

Optional drying air may be provided through a flexible air hose 34 connected at one end to a blower or other pressurized air supply unit 36 in the equipment room 14. The other end of the hose 34 is available in the wash room 12 to supply pressurized air to dry the pet after washing.

Figure 3:
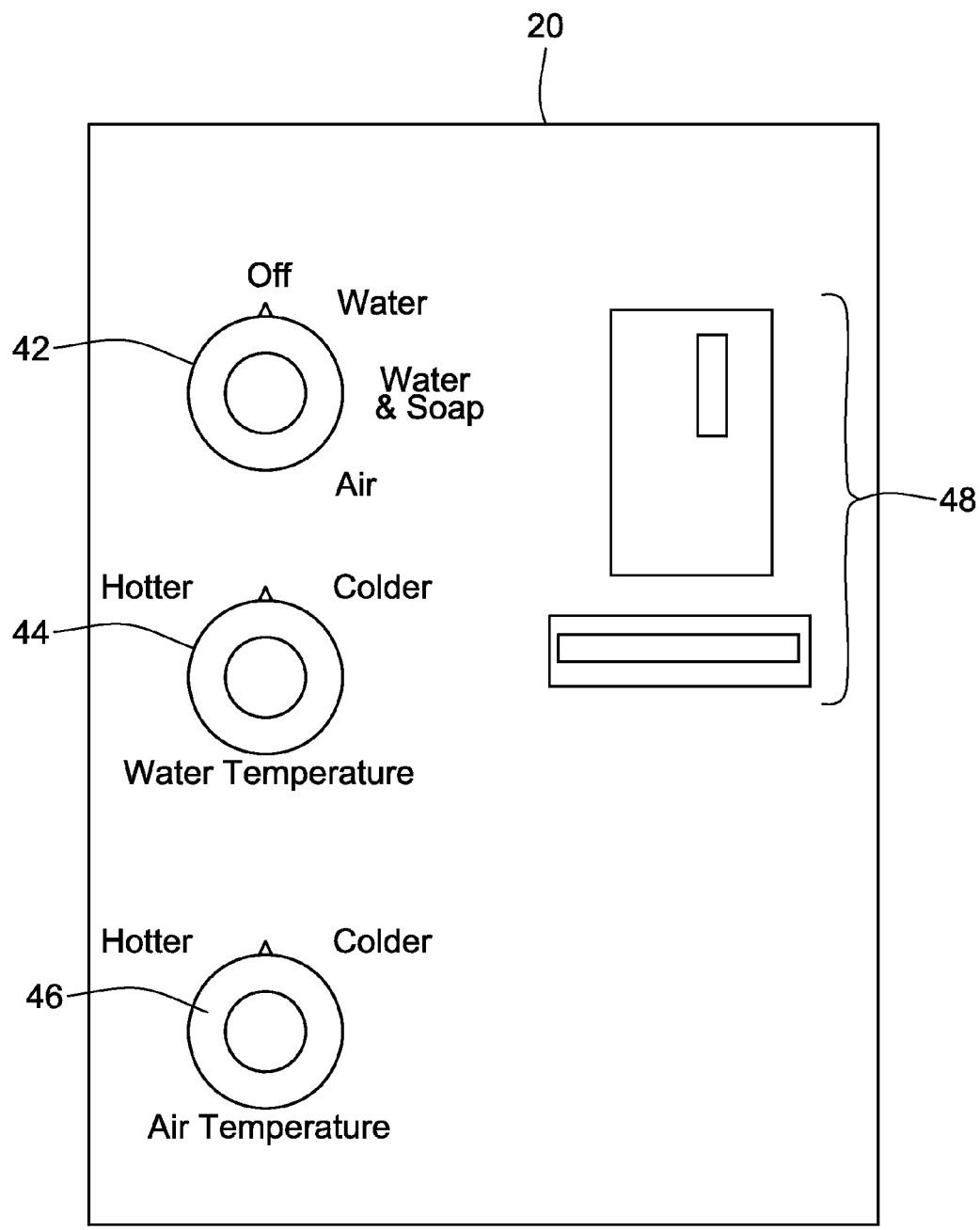
FIG. 3 is a front view of a control unit of the pet wash station of FIG. 1.

FIG. 3 illustrates the vending control unit 20, which controls the availability of washing liquid and drying air responsive to user selected input. In particular, in an arrangement for self-service wash facilities, the vending control unit accepts a wash-cycle selection made by the user (e.g., by selection of option(s) with one or more control knobs, illustrated as control knobs 42, 44, 46 in FIG. 3), and responsive thereto, controls the wash-water and air supply units in the equipment room 14. Thus the control unit controls the supply availability and length of time of the washing and rinsing fluid to the spray nozzle 26, and the control of the air to the drying hose 32. The vending control unit accepts payment from the user in any convenient form (e.g., coins, paper, tokens, debit or credit cards, etc.) to activate its operational control functions. FIG. 3 shows a control unit 20 with a knob 42 for selecting air, water, and soap, and a knob 44 for altering the water temperature, and a knob 46 for altering the air temperature. Further, FIG. 3 shows a payment interface for accepting change, bills, credit/debit cards, and any other conventional forms of on-site payment processing.

Typically, the vending control unit 20 is located inside of the washroom 12. However, in alternative embodiments, the vending control unit 20 is located outside of the washroom 12. As such, access to the washroom 12 is restricted until the user pays a predetermined fee to use the pet wash station 10.

Figure 4:
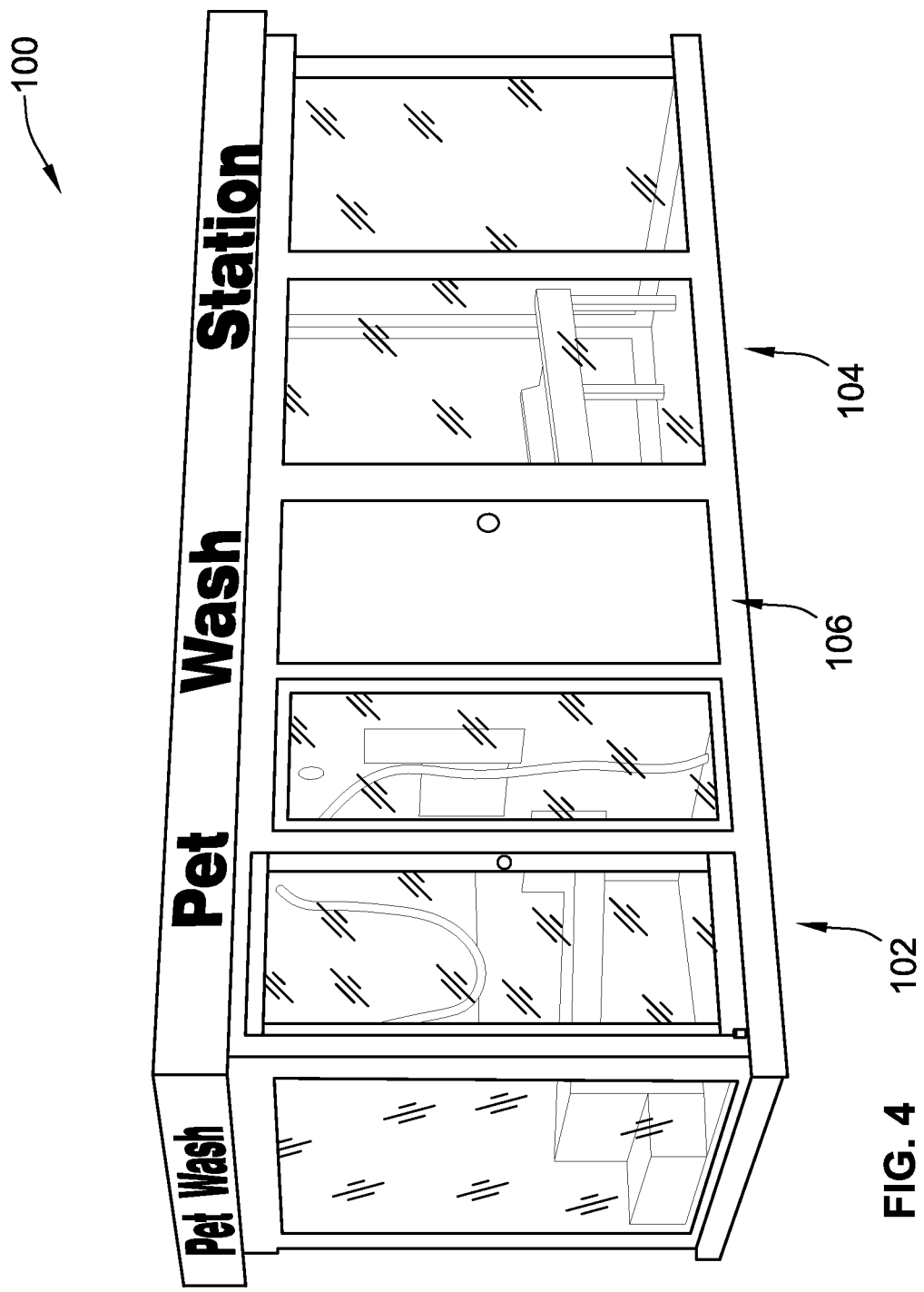
FIG. 4 is a perspective view of another embodiment of a pet wash station according to the invention.

FIG. 4 illustrates an embodiment of the pet wash vending station 100 that includes two separate wash rooms 102, 104 connected to a single equipment room 106. The wash rooms 102 and 104 and equipment room 106 are generally enclosures, each with a floor, a ceiling, surrounding sides, and their own individual doorways, but are connected together to establish a self-contained vending unit 100 that can be shipped as a single unit ready to be set into place and hooked up to site electrical power, water supply and sewer lines. Further, each individual wash room 102 and 104 contains all of the amenities of the previously described wash room 12 (see FIG. 1). The primary difference is equipment room 106 is shared between wash rooms 102 and 104. As such, the equipment room 106 contains an adequate water pump and an adequate air pump to supply two wash rooms 102 and 104. Further, equipment room 106 includes a common drainage trough that receives waste water and refuse from each of the individual wash rooms 102, 104 through openings in the bottoms of their respective common walls formed with equipment room 106. This "common trough" may be a single centrally located trough, or multiple interconnected troughs that in either case are in fluid communication with pumping system 38. In the case of multiple interconnected troughs, such an embodiment includes a trough positioned proximate the opening of each common wall. These troughs are connected by one or more cross pipes. This interconnected system is in turn connected to pumping system 38, and as such, functionally forms a common trough that operates in the same or similar manner as collection trough 32 illustrated in FIG. 2.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A portable pet wash station, comprising:
a washroom accessible from a washroom doorway including a tub for washing a pet and a washroom floor disposed under the tub;
an equipment room accessible from an equipment room doorway including an electric power connection, a water supply connection, and a sewer line connection, such that the portable wash station can be transported as a single unit and installed in any area that supports a connection for electric power, water, and sewer;
a common wall separating the washroom from the equipment room and disposed to restrict access from the washroom to the equipment room; and
a floor common to both the equipment room and the washroom, the floor having a collection trough formed therein for collection and drainage of waste water that accumulates on the washroom floor.

2. The portable pet wash station of claim 1, wherein access to the equipment room doorway is restricted from non-authorized personnel.

3. The portable pet wash station of claim 1, further comprising a space in the common wall at a juncture between the common wall and the washroom floor that provides a drainage path for waste water from the washroom to the equipment room, and particularly to the collection trough.

4. The portable pet wash station of claim 3, further comprising a drain formed in the collection trough that connects to the sewer line connection.

5. The portable pet wash station of claim 4, wherein the washroom floor is graded such that water and debris that gathers on the washroom floor drains through the space under the common wall and into the collection trough.

6. The portable pet wash station of claim 4, wherein a pumping system is operatively connected to the drain of the collection trough for pumping waste water through the sewer line connection.

7. The portable pet wash station of claim 1, wherein a liquid hose for discharging a fluid is situated in the wash room and connects to a wash-water supply contained in the equipment room.

8. The portable pet wash station of claim 7, further comprising a control unit, wherein the control unit allows the user to turn the wash-water supply on and off.

9. The portable pet wash station of claim 8, wherein the control unit allows the user to alter the temperature of the wash-water supply.

10. The portable pet wash station of claim 7, wherein the control unit allows the user to add soap to the wash-water supply.

11. The portable pet wash station of claim 1, further comprising an air supply unit in the equipment room that attaches to a first end of an air supply hose that includes a second end which extends through the common wall into the washroom.

12. The portable pet wash station of claim 11, further comprising a control unit, wherein the control unit allows the user to turn the air on and off, and control the temperature of the air.

13. The portable pet wash station of claim 1, wherein the surface area of the washroom floor is larger than a surface area of a washing surface of the tub, the washroom floor providing an alternate location for pet washing.

14. A portable pet wash station, comprising:
a first washroom accessible from a first washroom doorway including a first tub for washing, a first liquid hose for discharging liquid, a first washroom floor disposed under the first tub;
an equipment room accessible from an equipment room doorway including an electric power connection, a water supply connection, and a sewer line connection, such that the portable wash station can be transported as a single unit and installed in any area that supports a connection for electric power, water, and sewer;
a first common wall separating the first washroom from the equipment room and disposed to restrict access from the first washroom to the equipment room;
a second washroom accessible from a second washroom doorway including a second tub for washing, a second liquid hose for discharging liquid, a second washroom floor disposed under the second tub;
a second common wall separating the second washroom from the equipment room and disposed to restrict access from the second washroom to the equipment room; and
a collection trough formed in a floor of the equipment room, the collection trough positioned for collection and drainage of waste water that accumulates on the washroom floor.

15. The portable pet wash station of claim 14, wherein the first washroom and the second washroom are disposed on opposite sides of the equipment room.

16. The portable pet wash station of claim 14, further comprising a first space in the first common wall at a juncture between the first common wall and the first washroom floor that provides a drainage path from the first washroom to the collection trough, and a second space in the second common wall at a juncture between the second common wall and the second washroom floor that provides a drainage path from the second washroom to the collection trough.

17. The portable pet wash station of claim 16, further comprising a drain in the collection trough that connects to the sewer line connection, wherein a pumping system is operatively connected to the drain of the collection trough to pump waste water through the sewer line connection.

18. The portable pet wash station of claim 17, wherein the first washroom floor is graded such that water and debris that gathers on the first washroom floor drains through the first space under the first common wall and into the collection trough, and the second washroom floor is graded such that water and debris that gathers on the second washroom floor drains through the second space under the second common wall and into the collection trough.

19. The portable pet wash station of claim 18, wherein each of the first and second tubs includes a drain, the drain of the first tub extending through the first common wall and in fluid communication with the collection trough, the drain of the second tub extending through the second common wall and in fluid communication with the collection trough.

20. The portable pet wash station of claim 19, wherein each of the first and second tubs are graded such that water and debris that gathers in each of the first and second tubs drains through the respective drain thereof and into the collection trough.

* * * * *